US012456560B2

(12) United States Patent
Sekiya et al.

(10) Patent No.: US 12,456,560 B2
(45) Date of Patent: Oct. 28, 2025

(54) ALUMINUM WIRE, ALUMINUM STRANDED WIRE, COATED ELECTRIC WIRE, COATED ELECTRIC WIRE WITH CRIMP-STYLE TERMINAL, AND CVT CABLE OR CVT CABLE WITH CRIMP-STYLE TERMINAL

(71) Applicant: FURUKAWA ELECTRIC CO., LTD., Tokyo (JP)

(72) Inventors: Shigeki Sekiya, Tokyo (JP); Sho Yoshida, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 516 days.

(21) Appl. No.: 18/003,066

(22) PCT Filed: Aug. 6, 2021

(86) PCT No.: PCT/JP2021/029302
§ 371 (c)(1),
(2) Date: Dec. 22, 2022

(87) PCT Pub. No.: WO2022/030620
PCT Pub. Date: Feb. 10, 2022

(65) Prior Publication Data

US 2023/0343480 A1 Oct. 26, 2023

(30) Foreign Application Priority Data

Aug. 6, 2020 (JP) ................................ 2020-133765

(51) Int. Cl.
*H01B 1/02* (2006.01)
*C22C 21/08* (2006.01)
(Continued)

(52) U.S. Cl.
CPC ............. *H01B 1/023* (2013.01); *C22C 21/08* (2013.01); *C22F 1/047* (2013.01); *H01B 7/0009* (2013.01); *H01R 4/183* (2013.01); *H01R 4/62* (2013.01)

(58) Field of Classification Search
CPC ......... C22C 21/00; C22C 21/08; C22C 21/02; C22F 1/00; C22F 1/047; C22F 1/04;
(Continued)

(56) References Cited

U.S. PATENT DOCUMENTS

2017/0356069 A1 12/2017 Goto et al.
2018/0254118 A1* 9/2018 Nishi .................. H01B 7/0045
2019/0139668 A1 5/2019 Yoshida et al.

FOREIGN PATENT DOCUMENTS

CN 108538426 A 9/2018
CN 109312429 A 2/2019
(Continued)

OTHER PUBLICATIONS

Combined Chinese Office Action and Search Report issued Jul. 4, 2023 in Chinese Patent Application No. 202180005330.8 (with unedited computer-generated English Translation), 25 pages.
(Continued)

*Primary Examiner* — Jean F Duverne
(74) *Attorney, Agent, or Firm* — Oblon, McClelland, Maier & Neustadt, L.L.P.

(57) ABSTRACT

An aluminum wire rod has a composition which contains 3.00% by mass or less of Fe and 0.20% by mass or less of Si, and additionally contains a total of from 0.010% by mass to 0.500% by mass of one or more elements selected from the group consisting of Cu, Mn, Mg, Zn, Ti, B, V and Ni, with the balance being made up of Al and unavoidable impurities. With respect to this aluminum wire rod, in a 25 μm×60 μm region in a cross-section that is perpendicular to
(Continued)

the longitudinal direction, the total length of the portions where the crystal misorientation with respect to an adjacent crystal grain is more than 1° but not more than 15° is from 0.6 mm to 4.8 mm; and the electrical conductivity is 55% IACS or more.

15 Claims, 1 Drawing Sheet

(51) Int. Cl.

| | |
|---|---|
| ***C22F 1/047*** | (2006.01) |
| ***H01B 7/00*** | (2006.01) |
| ***H01R 4/18*** | (2006.01) |
| ***H01R 4/62*** | (2006.01) |

(58) Field of Classification Search

CPC .......... H01B 5/08; H01B 1/023; H01B 9/006; H01B 7/0009; H01R 4/20; H01R 4/183

See application file for complete search history.

(56) References Cited

FOREIGN PATENT DOCUMENTS

| | | | | | |
|---|---|---|---|---|---|
| JP | 2014-47372 | A | | 3/2014 | |
| JP | 6212946 | B2 | | 10/2017 | |
| JP | 2018009211 | A | * | 1/2018 | ............... H01B 1/02 |
| JP | 2018-145457 | A | | 9/2018 | |
| JP | 6683281 | B1 | | 4/2020 | |
| WO | WO 2012/011513 | A1 | | 1/2012 | |
| WO | WO-2019138820 | A1 | * | 7/2019 | ............... H01B 7/04 |

OTHER PUBLICATIONS

International Search Report issued Oct. 26, 2021 in PCT/JP2021/029302, filed on Aug. 6, 2021, 2 pages.

* cited by examiner

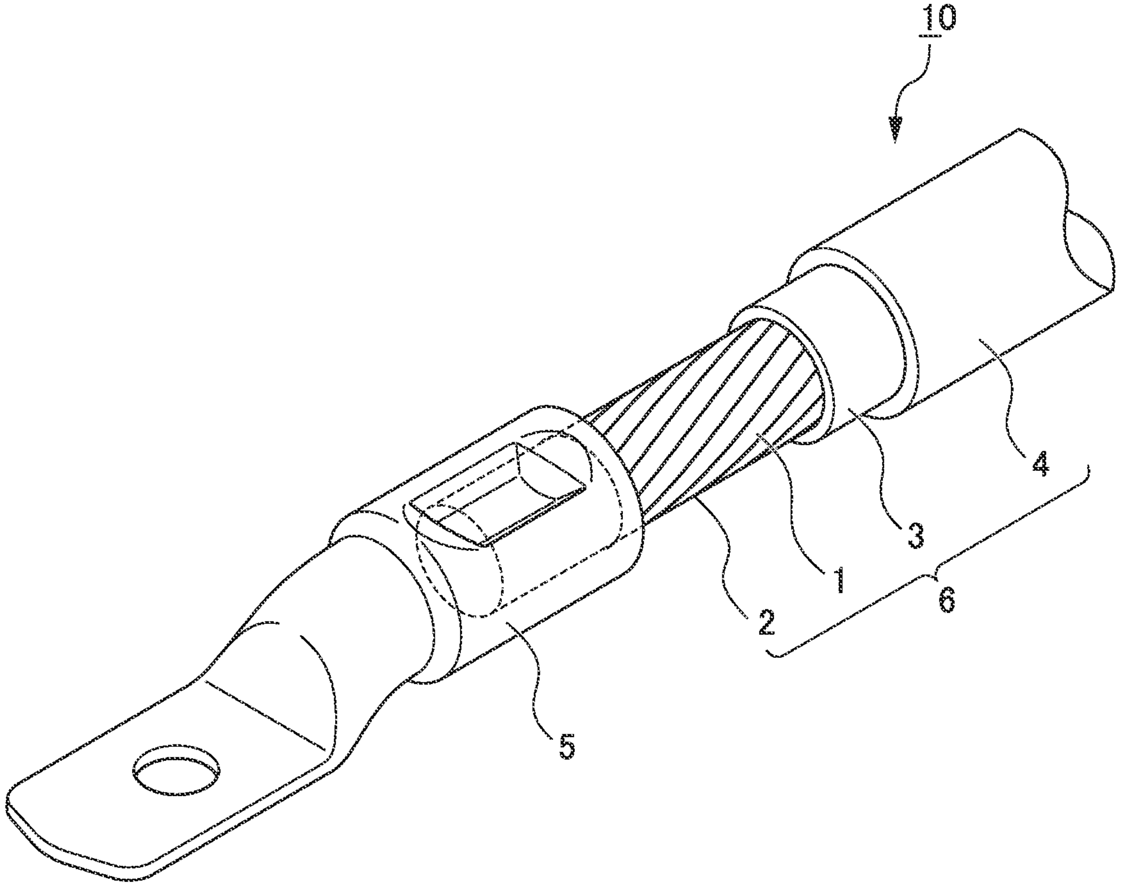
10
4
3
1
2
6
5

ALUMINUM WIRE, ALUMINUM STRANDED WIRE, COATED ELECTRIC WIRE, COATED ELECTRIC WIRE WITH CRIMP-STYLE TERMINAL, AND CVT CABLE OR CVT CABLE WITH CRIMP-STYLE TERMINAL

TECHNICAL FIELD

The present disclosure relates to an aluminum wire, an aluminum stranded wire, a coated electric wire, a coated electric wire with a crimp-style terminal, and a CVT cable or a CVT cable with a crimp-style terminal.

BACKGROUND ART

In the case of using aluminum in the power cable, including an underground distribution line such as a CVT cable, pure aluminum and aluminum alloys with a low additional elements content that both have high electrical conductivity can be used for the purpose of suppressing Joule heat. On the other hand, the strength of a wire of such pure aluminum and aluminum alloy is low compared to copper wire.

For example, Patent Document 1 discloses an aluminum alloy for wire containing 2.0% by mass or more and 3.5% by mass or less of Fe, in which the remainder is Al and inevitable impurities, and further containing 0.2% by mass or more and 1.0% by mass or less of Si. In addition, Patent Document 1 discloses an aluminum alloy wire with a structure having aluminum crystal grains and particles of Al—Fe compound consisting of a compound containing aluminum and iron or Al—Fe—Si compound, the particles of the Al—Fe compound or the Al—Fe—Si compound with the average size of 1000 nm or less being dispersed inside or at the grain boundary of the aluminum crystal grains.

As described above, Patent Document 1 improves the tensile strength of the aluminum alloy wire, by the addition of Fe and Si and control of the second phases. However, at the crimped part of a wire of such pure aluminum or aluminum alloy to a crimp-style terminal, although a decline in electrical conductivity, decline in crimped part strength and decline in shock resistance are problems, Patent Document 1 does not sufficiently consider the declines in these characteristics.

Patent Document 1: Japanese Patent No. 6212946

DISCLOSURE OF THE INVENTION

Problems to be Solved by the Invention

An object of the present disclosure is to provide an aluminum wire, an aluminum stranded wire, a coated electric wire, a coated electric wire with a crimp-style terminal, and a CVT cable or a CVT cable with a crimp-style terminal which can suppress a decline in electrical conductivity, a decline in crimped part strength and a decline in shock resistance at a crimp part with a crimp-style terminal, even when crimping by a crimp-style terminal.

Means for Solving the Problems

An aluminum wire according to a first aspect of the present disclosure includes a composition containing 3.00% by mass or more of Fe and 0.20% by mass or less of Si, and further contains 0.010% by mass or more and 0.500% by mass or less in total of at least one element selected from the group consisting of Cu, Mn, Mg, Zn, Ti, B, V and Ni, in which a remainder consists of Al and inevitable impurities, in which, within an area of 25 μm×60 μm in a cross section perpendicular to a longitudinal direction of the aluminum wire, a length adding together all portions having crystal misorientation of more than 1 degree and 15 degrees or less between adjacent crystal grains is 0.6 mm or more and 4.8 mm or less, and electrical conductivity of the aluminum wire is 55% IACS or more.

According to a second aspect of the present disclosure, in the aluminum wire as described in the first aspect, the composition contains 0.25% by mass or less of Fe.

According to a third aspect of the present disclosure, in the aluminum wire as described in the first or second aspect, a proportion of KAM value of crystal misorientation of more than 1 degree and 15 degrees or less relative to the area is 0.50 or more and 0.90 or less.

According to a fourth aspect of the present disclosure, in the aluminum wire as described in any one of the first to third aspects, an average crystal grain size in the cross section is 0.10 μm or more and 10.00 μm or less.

An aluminum stranded wire according to a fifth aspect of the present disclosure includes 19 or more and 61 or less of the aluminum wires as described in any one of the first to fourth aspects intertwined, in which wire diameters of the aluminum wires is 1.4 mm or more and 2.9 mm or less.

A coated electric wire according to a sixth aspect of the present disclosure includes the aluminum stranded wire as described in the fifth aspect, a cylindrical insulator which covers an outer circumference of the aluminum stranded wire, and a sheath which covers an outer circumference of the insulator.

A coated electric wire with a crimp-style terminal according to a seventh aspect of the present disclosure includes a crimp-style terminal which is crimped to the coated electric wire as described in the sixth aspect.

A CVT cable or a CVT cable with a crimp-style terminal according to an eighth aspect of the present disclosure includes three of the coated electric wires as described in the sixth aspect or the coated electric wires with the crimp-style terminal as described in the seventh aspect intertwined therein.

Effects of the Invention

According to the present disclosure, it is possible to provide an aluminum wire, an aluminum stranded wire, a coated electric wire, a coated electric wire with a crimp-style terminal, and a CVT cable or a CVT cable with a crimp-style terminal which can suppress a decline in electrical conductivity, a decline in crimped part strength and a decline in shock resistance at a crimp part with a crimp-style terminal, even when crimping by a crimp-style terminal.

BRIEF DESCRIPTION OF THE DRAWINGS

FIG. 1 is a perspective view showing an example of principle configurations of a coated electric wire with a crimp-style terminal having an aluminum wire of the present embodiment.

PREFERRED MODE FOR CARRYING OUT THE INVENTION

Hereinafter, the present invention will be explained in detail based on an embodiment.

The present inventors, as a result of diligent research, have found by focusing on the low angle grain boundary in the crystal structure of the aluminum wire that, even if crimped by a crimp-style terminal, it is possible to suppress a decline in electrical conductivity, a decline in crimped part strength and a decline in shock resistance at the crimped part with the crimp-style terminal, and based on this knowledge, arrived at completing the present disclosure.

An aluminum wire of the present embodiment has a composition containing 3.00% by mass or less of Fe and 0.20% by mass or less of Si, and further containing 0.010% by mass or more and 0.500% by mass or less in total of at least one element selected from the group consisting of Cu, Mn, Mg, Zn, Ti, B, V and Ni, in which the remainder consists of Al and inevitable impurities, and, within an area of 25 μm×60 μm in a cross section perpendicular to a longitudinal direction of the aluminum wire, a length adding together all portions having crystal misorientation of more than 1 degree and 15 degrees or less between adjacent crystal grains is 0.6 mm or more and 4.8 mm or less, and the electrical conductivity of the aluminum wire is 55% IACS or more.

FIG. 1 is a perspective view showing an example of principle configurations of a coated electric wire with a crimp-style terminal having the aluminum wire of the present embodiment. As shown in FIG. 1, the coated electric wire with the crimp-style terminal 10 has an aluminum stranded wire 2 made by intertwining a plurality of the aluminum wires 1. A cylindrical insulator 3 is provided at the outer circumference of the aluminum stranded wire 2. A cylindrical sheath 4 is provided at the outer circumference of the insulator 3. The coated electric wire 6 has the aluminum stranded wire 2, the insulator 3 and the sheath 4. At a portion at which the aluminum stranded wire 2 of the coated electric wire with the crimp-style terminal 10 is exposed, a crimp-style terminal 5 is crimped.

<Composition>

First, the composition of the aluminum wire will be explained. The composition of the aluminum wire contains 3.00% by mass or less of Fe and 0.20% by mass or less of Si, and further contains 0.010% by mass or more and 0.500% by mass or less in total of at least one element selected from the group consisting of Cu, Mn, Mg, Zn, Ti, B, V and Ni, and the remainder consists of Al and inevitable impurities.

Regarding the composition of the aluminum wire, when the content of Al is 99.5% by mass or more, the electrical conductivity improves, and the availability rises. From such a viewpoint, the content of Al is preferably 99.7% by mass or more. The composition of the aluminum wire is preferably a composition of pure aluminum such as A1070.

Fe (iron) is an element which improves the strength of the aluminum wire. The content of Fe contained in the aluminum wire is preferably 0.05% by mass or more, and more preferably 0.10% by mass or more. If the content of Fe is 0.05% by mass or more, the strength of the aluminum wire increases, and it is possible to sufficiently suppress a decline in the crimped part strength and a decline in the shock resistance of the crimped part which is crimped by the crimp-style terminal. In addition, the content of Fe contained in the aluminum wire is 3.00% by mass or less, and is preferably 0.25% by mass or less due to a smaller content of Fe being better in the case of high electrical conductivity being demanded.

Si (silicon) is an element which improves the strength of the aluminum wire. The content of Si contained in the aluminum wire is preferably 0.01% by mass or more, and more preferably 0.05% by mass or more. If the content of Si is 0.01% by mass or more, the strength of the aluminum wire improves, and it is possible to sufficiently suppress the decline in the crimped part strength and the decline in the shock resistance of the crimped part. In addition, the content of Si contained in the aluminum wire is 0.20% by mass or less, and is preferably 0.15% by mass or less. If the content of Si exceeds 0.20% by mass, it will be a practical problem due to a decline in electrical conductivity.

<Auxiliary Components>

The composition of the aluminum wire can further contain at least one element selected from the group consisting of Cu, Mn, Mg, Zn, Ti, B, V and Ni. These components are contained in total of 0.010% by mass or more and 0.500% by mass or less, when considering the balance of the strength and the electrical conductivity. Hereinafter, each of the auxiliary components will be explained independently.

If the content of Cu (copper) is 0.010% by mass or more, since it is possible to improve the strength of the aluminum wire while maintaining the high electrical conductivity of the aluminum wire, it is possible to suppress the decline in the crimped part strength and the decline in the shock resistance of the crimped part. If the content of Cu is 0.100% by mass or less, it is possible to maintain the high electrical conductivity. For this reason, the lower limit value for the content of Cu is preferably 0.010% by mass or more, and more preferably 0.030% by mass or more, and the upper limit value for the content of Cu is preferably 0.100% by mass or less, and more preferably 0.050% by mass or less.

If the content of Mn (manganese) is 0.010% by mass or more, it is possible to improve the strength of the aluminum wire, while maintaining the high electrical conductivity of the aluminum wire. If the content of Mn is 0.100% by mass or less, it is possible to maintain the high electrical conductivity. For this reason, the lower limit value for the content of Mn is preferably 0.010% by mass or more, and more preferably 0.030% by mass or more, and the upper limit value for the content of Mn is preferably 0.100% by mass or less, and more preferably 0.080% by mass or less.

If the content of Mg (magnesium) is 0.030% by mass or more, it is possible to improve the strength of the aluminum wire, while maintaining the high electrical conductivity of the aluminum wire. If the content of Mg is 0.500% by mass or less, it is possible to maintain the high electrical conductivity. For this reason, the lower limit value for the content of Mg is preferably 0.030% by mass or more, and more preferably 0.100% by mass or more, and the upper limit value for the content of Mg is preferably 0.500% by mass or less, and more preferably 0.200% by mass or less.

If the content of Zn (zinc) is 0.020% by mass or more, it is possible to improve the strength of the aluminum wire, while maintaining the high electrical conductivity of the aluminum wire. If the content of Zn is 0.100% by mass or less, it is possible to maintain the high electrical conductivity. For this reason, the lower limit value for the content of Zn is preferably 0.020% by mass or more, and more preferably 0.050% by mass or more, and the upper limit value for the content of Zn is preferably 0.100% by mass or less, and more preferably 0.080% by mass or less.

If the content of Ti (titanium) is 0.005% by mass or more, since the crystals in the aluminum ingot obtained in the casting process are refined, cracking and breaking comes to hardly occur during cold wire drawing performed subsequently. If the content of Ti is 0.100% by mass or more, it is possible to maintain the high ductility and the high electrical conductivity. For this reason, the lower limit value for the content of Ti is preferably 0.005% by mass or more, and more preferably 0.010% by mass or more, and the upper limit value for the content of Ti is preferably 0.100% by mass or less, and more preferably 0.050% by mass or less.

If the content of B (boron) is 0.004% by mass or more, since the crystals in the aluminum ingot obtained in the casting process are refined, cracking and breaking comes to hardly occur during cold wire drawing. If the content of B is 0.050% by mass or less, it is possible to maintain the high ductility and the high electrical conductivity. For this reason, the lower limit value for the content of B is preferably 0.004% by mass or more, and more preferably 0.010% by mass or more, and the upper limit value for the content of B is preferably 0.050% by mass or less, and more preferably 0.030% by mass or less.

If the content of V (vanadium) is 0.003% by mass or more, it is possible to easily remove impurities from the molten metal during the casting process. If the content of Vis 0.050% by mass or less, it is possible to maintain the high ductility and the high electrical conductivity. For this reason, the lower limit value for the content of Vis preferably 0.003% by mass or more, and more preferably 0.005% by mass or more, and the upper limit value for the content of V is preferably 0.050% by mass or less, and more preferably 0.030% by mass or less.

If the content of Ni (nickel) is 0.005% by mass or more, it is possible to improve the strength of the aluminum wire, while maintaining the high electrical conductivity of the aluminum wire. If the content of Ni is 0.020% by mass or less, it is possible to maintain the high electrical conductivity. For this reason, the lower limit value for the content of Ni is preferably 0.005% by mass or more, and more preferably 0.010% by mass or more, and the upper limit value for the content of Ni is preferably 0.020% by mass or less, and more preferably 0.015% by mass or less.

<Remainder: Al and Inevitable Impurities>

For the composition of the aluminum wire, the remainder other than the aforementioned components is Al (aluminum) and inevitable impurities. The inevitable impurities may be contained inevitably in the manufacturing process, and since it may become a cause reducing the electrical conductivity and the strength of the aluminum wire depending on the content of the inevitable impurities, the content of the inevitable impurities is preferably small. As the inevitable impurities, for example, elements such as Li and Cr can be exemplified. The upper limit for the content of the inevitable impurities is preferably 0.05% by mass or less, and more preferably 0.01% by mass or less.

<Electrical Conductivity>

Next, the electrical conductivity of the aluminum wire will be explained. The aluminum wire has high electrical conductivity. The resistance value is measured by the four-terminal method in a constant temperature bath kept at 20° C. (+/−0.5° C.) with a distance between terminals of 200 mm, and the electrical conductivity of the aluminum wire can be calculated from the cross section area of the aluminum wire. The electrical conductivity of the aluminum wire is 55% IACS or more, and preferably 62% IACS or more.

<Crystal Misorientation>

Next, the crystal misorientation of the aluminum wire will be explained. Within an area of 25 μm×60 μm (hereinafter referred to simply as area) of a cross section perpendicular to the longitudinal direction of the aluminum wire (hereinafter referred to as transverse cross section), the length adding together all portions having crystal misorientation of more than 1 degree and 15 degrees or less between adjacent crystal grains (hereinafter referred to simply as length) is 0.6 mm or more and 4.8 mm or less. In this way, within the above-mentioned area of the transverse cross section of the aluminum wire, the portion having crystal misorientation of more than 1 degree and 15 degrees or less between adjacent crystal grains, i.e. the low angle grain boundary, has a length within the above-mentioned range.

If the above-mentioned length within the above-mentioned area is 0.6 mm or more, since distortion due to the low angle grain boundary remains in a predetermined amount in the aluminum wire, the balance of the strength and the ductility of the aluminum wire is favorable. Furthermore, if the distortion due to the low angle grain boundary remains in a predetermined amount in the aluminum wire, since it is possible to decrease the change of the physical properties at the crimped part which is crimped by the crimp-style terminal, it is possible to suppress the decline in the crimped part strength and the decline in the shock resistance of the crimped part. In addition, if the above-mentioned length within the above-mentioned area is 4.8 mm or less, it is possible to suppress the decline in ductility of the aluminum wire accompanying excess distortion due to the low angle grain boundary, and possible to suppress the decline in the shock resistance of the crimped part. From such a viewpoint, the lower limit value for the above-mentioned length within the above-mentioned area is 0.6 mm or more, and preferably 1.5 mm or more, and the upper limit value thereof is 4.8 mm or less, and preferably 4.0 mm or less.

The length adding together all portions having crystal misorientation of more than 1 degree and 15 degrees or less between adjacent crystal grains can be obtained from the crystal orientation analysis data calculated using analysis software (OIM Analysis produced by TSL Inc.) from crystal orientation data measured continuously using an EBSD detector (OIM 5.0 HIKARI manufactured by TSL Inc.) attached to a high resolution scanning analytical electron microscope (JSM-7001FA manufactured by JOEL Ltd.). "EBSD" is an abbreviation of Electron BackScatter Diffraction, and is a crystal orientation analysis technique using reflected electron Kikuchi line diffraction that occurs when irradiating an electron beam onto the aluminum wire as a measurement sample in a scanning electron microscope (SEM). "OIM Analysis" is analysis software for data measured by EBSD. The measurement target is the surface prepared by mirror finishing a cross section perpendicular to the longitudinal direction of one aluminum wire by electropolishing, and the measurement area is 25 μm×60 μm. The measurement is performed at the step size of 0.1 μm. Based on images of Rotation Angle, the length adding together all of the portions having crystal misorientation of more than 1 degree and 15 degrees or less between adjacent crystal grains is calculated by the analysis software. This measurement is performed at n3 (sample of three aluminum wires), the average value thereof was calculated.

<KAM>

In addition, the proportion of the KAM value of crystal misorientation of more than 1 degree and 15 degrees or less relative to the above-mentioned area of a cross section perpendicular to the longitudinal direction of the aluminum wire is preferably 0.50 or more and 0.90 or less.

If the proportion of the above-mentioned KAM value is 0.50 or more, since distortion including the low angle grain boundary and crystal grains remain in a predetermined amount in the aluminum wire, the balance of the strength and the ductility of the aluminum wire is favorable. Furthermore, if the distortion including the low angle grain boundary and the crystal grains remain in a predetermined amount, since it is possible to decrease the change of the physical properties at the crimped part, it is possible to suppress the decline in the crimped part strength and the decline in the shock resistance of the crimped part. In addition, if the proportion of the above-mentioned KAM value is 0.90 or less, it is possible to suppress the decline in the ductility of the aluminum wire accompanying excess distortion including the low angle grain boundary and the crystal grains, and possible to suppress the decline in the shock resistance of the crimped part. From such a viewpoint, the lower limit value for the proportion of the above-mentioned KAM value is preferably 0.50 or more, and more preferably 0.60 or more, and the upper limit value thereof is preferably 0.90 or less, and more preferably 0.85 or less.

The KAM (Kernel Average Misorientation) value represents the average misorientation between a measurement point and a measurement point at the circumference of the measurement point. If the misorientation is large, the KAM value will increase. If the KAM value is large, the distortion abundantly exists in the aluminum wire.

The KAM value can be obtained from the crystal orientation analysis data calculated using analysis software (OIM Analysis produced by TSL Inc.) from crystal orientation data measured continuously using an EBSD detector (OIM 5.0 HIKARI manufactured by TSL Inc.) attached to a high resolution scanning analytical electron microscope (JSM-7001FA manufactured by JOEL Ltd.). The measurement target is the surface prepared by mirror finishing a cross section perpendicular to the longitudinal direction of one aluminum wire by electropolishing, and the measurement area is 25 μm×60 μm. Measurement is performed at the step size of 0.1 μm. The proportion of the KAM value having crystal misorientation of more than 1 degree and 15 degrees or less relative to the measurement area was calculated with the KAM image by the analysis software. It should be noted that the maximum value of the KAM valve is set to 15 degrees. This measurement is performed at n3 (sample of three aluminum wires), and the average value thereof is calculated.

<Crystal Grain Size>

In addition, the average crystal grain size in the transverse cross section of the aluminum wire is preferably 0.10 μm or more and 10.00 μm or less.

If the above-mentioned average crystal grain size is 0.10 μm or more, it is possible to suppress the decline in the ductility of the aluminum wire. In addition, if the above-mentioned average crystal grain size is 10.00 μm or less, it is possible to suppress the decline in the strength of the aluminum wire. From such a viewpoint, the lower limit value for the average crystal grain size in a cross section of the aluminum wire is preferably 0.10 μm or more, and more preferably 0.20 μm or more, and the upper limit value thereof is preferably 10.00 μm or less, and is more preferably 5.00 μm or less.

The average crystal grain size can be obtained from the crystal orientation analysis data calculated using analysis software (OIM Analysis produced by TSL Inc.) from crystal orientation data measured continuously using an EBSD detector (OIM 5.0 HIKARI manufactured by TSL Inc.) attached to a high resolution scanning analytical electron microscope (JSM-7001FA manufactured by JOEL Ltd.). The measurement target is the surface prepared by mirror finishing a cross section perpendicular to the longitudinal direction of one aluminum wire by electropolishing, and the measurement area is 25 μm×60 μm. Measurement is performed at the step size of 0.1 μm. The average crystal grain size is calculated with a Grain Size (Diameter) chart by the analysis software. This measurement is performed at n3 (sample of three aluminum wires), and the average value thereof is calculated.

<Stranded Wire>

In addition, also with an aluminum stranded wire made by intertwining a plurality of the above-mentioned aluminum wires as element wires, even if crimping by a crimp-style terminal similarly to the above-mentioned aluminum wire, it is possible to suppress a decline in electrical conductivity, a decline in crimped part strength and a decline in shock resistance at the crimped part with the crimp-style terminal. With the aluminum stranded wire made by intertwining 19 or more and 61 or less of the aluminum wires having a wire diameter of 1.4 mm or more and 2.9 mm or less, the decline in the electrical conductivity, the decline in the crimped part strength and the decline in the shock resistance of the crimped part are further suppressed. In particular, if there are 19 or more of the aluminum wires having a wire diameter within the above-mentioned range, since the flexibility of the aluminum stranded wire increases, it is possible to improve the workability of the aluminum stranded wire. In addition, if there are 61 or less of the aluminum wires having a wire diameter within the above-mentioned range, it is possible to suppress the occurrence of wire breaking of the aluminum wire constituting the aluminum stranded wire. The number of wires and the wire diameters of the aluminum wires constituting the aluminum stranded wire are appropriately selected according to the use of the aluminum stranded wire such as the energizing current value and the heat resistance temperature of the aluminum stranded wire.

<Application>

In addition, a coated electric wire having the above-mentioned aluminum stranded wire made by intertwining a plurality of the above-mentioned aluminum wires, a cylindrical insulator covering the outer circumference of the aluminum stranded wire, and a sheath covering the outer circumference of the insulator can suppress a decline in electrical conductivity, a decline in crimped part strength and a decline in shock resistance of the crimped part with the crimp-style terminal, even when crimped by the crimp-style terminal, similarly to the above-mentioned aluminum wire and the above-mentioned aluminum stranded wire. Furthermore, the coated electric wire has favorable insulation property and heat resistance property due to having the insulator and the sheath. If the insulator is constituted from polyolefin such as polyethylene and polypropylene, a polyvinylchloride or the like, the insulation property of the coated electric wire is more favorable. In addition, if the sheath is constituted from a vinyl chloride resin, or flame-resistant polyethylene, the heat resistance property of the coated electric wire is more favorable.

In addition, a coated electric wire with a crimp-style terminal crimped to the above-mentioned coated electric wire, more specifically, a coated electric wire with a crimp-style terminal that has the above-mentioned coated electric wire and the crimp-style terminal crimped to the aluminum stranded wire constituting the above-mentioned coated electric wire, can suppress a decline in electrical conductivity, a decline in crimped part strength and a decline in shock resistance of the crimped part with the crimp-style terminal, even when crimped by the crimp-style terminal, similarly to the above-mentioned aluminum wire and the above-mentioned aluminum stranded wire. As shown in FIG. 1, with the coated electric wire with the crimp-style terminal 10, the crimp-style terminal 5 is crimped to a portion of the aluminum stranded wire 2 exposed by peeling off, i.e. stripping off, a part of the insulator 3 and the sheath 4 from the coated electric wire 6. The crimp-style terminal is configured from a copper-based material including pure copper or copper alloy, or an aluminum-based material including pure aluminum or aluminum alloy.

In addition, also with a power cable made by intertwining a plurality of the above-mentioned coated electric wires, it is possible to suppress a decline in electrical conductivity, a decline in crimped part strength and a decline in shock resistance of the crimped part with the crimp-style terminal, even when crimped by the crimp-style terminal, similarly to the aforementioned. A CVT cable made by intertwining three of the above-mentioned coated electric wires is suited to three-phase alternating current wiring for which suppression of a decline in the above-mentioned electrical conductivity, crimped part strength and shock resistance are particularly demanded.

In addition, the CVT cable with crimp-style terminal that has the above-mentioned CVT cable and the crimp-style terminal crimped to the aluminum stranded wire constituting the CVT cable can suppress a decline in electrical conductivity, a decline in crimped part strength and a decline in shock resistance of the crimped part with the crimp-style terminal, even when crimped by the crimp-style terminal, similarly to the aforementioned. With the CVT cable with crimp-style terminal, the crimp-style terminal is crimped to a portion of the aluminum stranded wire exposed by stripping off a part of the insulator and the sheath from at least one coated electric wire among the three coated electric wires constituting the CVT cable.

<Manufacturing Method>

Next, a manufacturing method of the above-mentioned aluminum wire will be explained. First, a rough drawing wire with a wire diameter of 5 mm or more and 10 mm or less is obtained by a continuous cast-rolling machine using molten metal adjusted to predetermined components with a melting furnace. Subsequently, with the purpose of adjusting the recrystallization driving force, a first annealing is performed on the rough drawing wire at the conditions of a heating temperature of 550° C. or more and 630° C. or less and a heating time of 0.5 hours or more and 3 hours or less. Next, cold wire drawing is performed at a processing rate of 50% or more and 99% or less. Next, in order to adjust the strain amount and the crystal grain size, a contact-type annealing to bring the wire and heating body into contact is performed on the conditions of a heating temperature of 150° C. or more and 400° C. or less and a heating time of 1 second or more and 20 seconds or less. It is possible to obtain an aluminum wire in this way. Subsequently, a plurality of the aluminum wires are bundled with a stranding machine to make an aluminum stranded wire, the insulator coating is conducted on this aluminum stranded wire with an extruder, and the sheathing is conducted on the outer circumference thereof, whereby it is possible to obtain a coated electric wire. Furthermore, the aluminum stranded wire is partially exposed by peeling off the insulator and the sheath of the terminal end of the coated electric wire, then inserted into a tube part of the terminal, which is a connection member, and crimped by applying pressure from the outer circumference of the tube part, whereby it is possible to obtain a coated electric wire with a crimp-style terminal. Furthermore, a CVT cable can be obtained by intertwining three of the above-mentioned coated electric wires.

In the above-mentioned first annealing conditions, if performing annealing with a heating time of less than 0.5 hours within the above-mentioned temperature range or annealing within the above-mentioned heating time range at a heating temperature of less than 550° C., deviation of the composition arises in the obtained aluminum wire, wire breakage tends to occur during wire drawing, and the productivity worsens. In addition, in the above-mentioned first annealing conditions, if performing annealing with a heating time of exceeding 3 hours within the above-mentioned temperature range or annealing within the above-mentioned heating time range at a heating temperature of exceeding 630° C., in the obtained aluminum wire, the material strength will be insufficient against the pulling force during wire drawing, and wire drawing is not possible.

If performing cold wire drawing with a processing rate of less than 50%, the length adding together all portions having crystal misorientation of more than 1 degree and 15 degrees or less between adjacent crystal grains tends to be shorter in the obtained aluminum wire, and the possibility of becoming less than 0.6 mm rises according to the combination with contact-type annealing later. For this reason, the crimped part strength of the crimped part declines. In addition, if performing cold wire drawing with a processing rate of exceeding 99%, the length adding together all portions having crystal misorientation of more than 1 degree and 15 degrees or less between adjacent crystal grains tends to be longer, and the possibility of becoming exceeding 4.8 mm rises according to the combination with contact-type annealing later. For this reason, the shock resistance of the crimped part declines accompanying a decline in ductility.

If performing cold wire drawing with a processing rate of 50% or more, the proportion of the KAM value of the crystal misorientation of more than 1 degree and 15 degrees or less tends to be 0.50 or more, although depending on the combination with the contact-type annealing later. For this reason, it is possible to suppress a decline in the crimped part strength of the crimped part. In addition, if performing cold wire drawing with a processing rate of 99% or less, the proportion of the KAM value of the crystal misorientation of more than 1 degree and 15 degrees or less tends to be 0.90 or less, although depending on the combination with the contact-type annealing later. For this reason, it is possible to suppress a decline in the shock resistance of the crimped part accompanying a decline in ductility.

In the conditions of the above-mentioned contact-type annealing, if performing annealing with an annealing time of less than 1 second within the above-mentioned temperature range or annealing within the above-mentioned heating time range at a heating temperature of less than 150° C., the length adding together all portions having crystal misorientation of more than 1 degree and 15 degrees or less between adjacent crystal grains will exceed 4.8 mm in the obtained aluminum wire. For this reason, the shock resistance at the crimped part declines accompanying a decline in ductility. In addition, if performing annealing with a heating time of exceeding 20 seconds within the above-mentioned temperature range or annealing within the above-mentioned heating time range at a heating temperature of exceeding 400° C., the length adding together all portions having crystal misorientation of more than 1 degree and 15 degrees or less between adjacent crystal grains will be less than 0.6 mm in the obtained aluminum wire. For this reason, the crimped part strength at the crimped part declines.

According to the embodiment explained above, by manufacturing involving variously controlling the component composition, the continuous cast-rolling conditions, the first annealing conditions, the wire drawing conditions and the contact-type annealing conditions, it is possible to control the length adding together all portions having crystal misorientation of more than 1 degree and 15 degrees or less between adjacent crystal grains and the electrical conductivity to within the predetermined range respectively, a result of which, even if the aluminum wire is crimped by the crimp-style terminal, it is possible to suppress the decline in the electrical conductivity, the decline in the crimped part strength and the decline in the shock resistance of the crimped part with the crimp-style terminal. Such an aluminum wire is favorable as an aluminum wire for aluminum stranded wire with a crimp-style terminal.

Although embodiments have been explained above, the present invention is not to be limited to the above-mentioned embodiments, and includes every mode encompassed by the concept of the present invention and claims, and can be modified in various ways within the scope of the present disclosure.

EXAMPLES

Next, examples and comparative examples will be explained, however, the present invention is not to be limited to these examples.

Examples 1 to 21

By performing the first annealing, the cold wire drawing and the contact-type annealing at conditions such that satisfy the crystal structure shown in Table 1 using the molten metal with the composition shown in Table 1, then using the aluminum wires of the wire diameter and the wire number shown in Table 2, the stranded wire was made by intertwining, then a coated electric wire was made through the insulator coating and the sheathing process for the stranded wire, the aluminum stranded wire was partially exposed by peeling the insulator and the sheath at the both ends of the coated electric wire, the terminals were crimped at the exposed portions to obtain the coated electric wire with the crimp-style terminals. It should be noted that, as the terminal that is the connection member, a terminal made of aluminum was used, and the inner side of the tube part of the terminal was sealed with a compound which is oil containing zinc powder for maintaining electrical contact with the exposed aluminum stranded wire. Crimping was done at a compression ratio of 94%. The compression ratio is a proportion of the cross sectional area of the aluminum conductor after the crimping relative to the cross sectional area of the aluminum conductor prior to the crimping. The cross section is a central portion of the crimped part cut perpendicular to the longitudinal direction of the terminal, and the terminal was manufactured so that the compression ratio was determined according to the crimping depth, therefore, the compression ratio was required beforehand.

Comparative Example 1

After obtaining a rough drawing wire containing 3.50% by mass of Fe and of 9.5 mm wire diameter by a continuous cast-rolling machine, the annealing was performed at the heating temperature of 550° C. and the heating time of 2 hours. Next, the cold wire drawing was performed at the processing rate of 97%, and the contact-type annealing was performed at the heating temperature of 300° C. and the heating time of 10 seconds. Subsequent processes were conducted similarly to Example 1 to obtain the coated electric wire with the crimp-style terminals.

Comparative Example 2

Other than containing 0.50% by mass of Si, and containing 0.530% by mass of a total of Mn, Mg, Ti, B and V with the composition shown in Table 1, it was prepared similarly to Comparative Example 1.

Comparative Example 3

Up until performing the cold wire drawing at the processing rate of 97% with the composition shown in Table 1, it was prepared similarly to Comparative Example 1, and subsequently was finished without the contact-type annealing being conducted. Subsequent processes were conducted similarly to Example 1 to obtain the coated electric wire with the crimp-style terminals.

Comparative Example 4

Up until performing the annealing at the heating temperature of 550° C. and the heating time of 2 hours with the composition shown in Table 1, it was prepared similarly to Comparative Example 1, and subsequently the wire was drawn until the wire diameter of 1.5 mm. Next, after performing annealing at the heating temperature of 300° C. and the heating time of 2 hours, the wire drawing was performed until the wire diameter of 1.4 mm. Subsequently, the contact-type annealing was performed at 300° C. for 10 seconds. Subsequent processes were performed similarly to Example 1 to obtain the coated electric wire with the crimp-style terminals.

Comparative Example 5

Up until performing the cold wire drawing at the processing rate of 97% with the composition shown in Table 1, it was prepared similarly to Comparative Example 1, and subsequently, the contact-type annealing was performed at 550° C. for 10 seconds. Subsequent processes were performed similarly to Example 1 to obtain the coated electric wire with the crimp-style terminals.

TABLE 1

| | Composition (% by mass) | | | | | | | | | | | | Crystal structure | | |
|---|---|---|---|---|---|---|---|---|---|---|---|---|---|---|---|
| | | | Other components | | | | | | | | | | Length of portions having crystal misorientation of more than 1° and 15° or less | Proportion of KAM value | Average crystal grain size |
| | Fe | Si | Cu | Mn | Mg | Zn | Ti | B | V | Ni | Total | Al | (mm) | | (μm) |
| Example 1 | 0.05 | 0.01 | — | — | — | — | 0.005 | 0.005 | — | — | 0.010 | Remainder | 2.5 | 0.65 | 0.24 |
| Example 2 | 0.15 | 0.05 | — | — | — | — | 0.010 | 0.005 | 0.005 | — | 0.020 | Remainder | 2.8 | 0.70 | 0.21 |
| Example 3 | 0.15 | 0.06 | — | — | — | — | 0.010 | 0.004 | 0.005 | — | 0.019 | Remainder | 2.3 | 0.63 | 0.27 |
| Example 4 | 0.15 | 0.06 | — | — | — | — | 0.010 | 0.004 | 0.005 | — | 0.019 | Remainder | 1.2 | 0.60 | 0.40 |
| Example 5 | 0.15 | 0.06 | — | — | — | — | 0.010 | 0.004 | 0.005 | — | 0.019 | Remainder | 2.2 | 0.62 | 0.28 |
| Example 6 | 0.15 | 0.06 | — | — | — | — | 0.010 | 0.004 | 0.005 | — | 0.019 | Remainder | 4.8 | 0.90 | 0.10 |
| Example 7 | 0.15 | 0.06 | — | — | — | — | 0.010 | 0.004 | 0.005 | — | 0.019 | Remainder | 3.6 | 0.78 | 0.15 |

TABLE 1-continued

| | Composition (% by mass) | | | | | | | | | | | | Crystal structure | | |
|---|---|---|---|---|---|---|---|---|---|---|---|---|---|---|---|
| | Other components | | | | | | | | | | | | Length of portions having crystal misorientation of more than 1° and 15° or less | Proportion of KAM value | Average crystal grain size |
| | Fe | Si | Cu | Mn | Mg | Zn | Ti | B | V | Ni | Total | Al | (mm) | | (μm) |
| Example 8 | 0.15 | 0.06 | — | — | — | — | 0.010 | 0.004 | 0.005 | — | 0.019 | Remainder | 0.9 | 0.57 | 1.20 |
| Example 9 | 0.15 | 0.06 | — | — | — | — | 0.010 | 0.004 | 0.005 | — | 0.019 | Remainder | 0.6 | 0.50 | 2.31 |
| Example 10 | 0.15 | 0.06 | — | — | — | — | 0.010 | 0.004 | 0.005 | — | 0.019 | Remainder | 0.8 | 0.55 | 4.85 |
| Example 11 | 0.15 | 0.06 | — | — | — | — | 0.010 | 0.004 | 0.005 | — | 0.019 | Remainder | 0.7 | 0.53 | 7.89 |
| Example 12 | 0.15 | 0.06 | — | — | — | — | 0.010 | 0.004 | 0.005 | — | 0.019 | Remainder | 0.6 | 0.51 | 9.98 |
| Example 13 | 0.50 | 0.06 | — | — | — | — | 0.010 | 0.004 | 0.005 | — | 0.019 | Remainder | 3.0 | 0.72 | 0.20 |
| Example 14 | 1.00 | 0.06 | — | — | — | — | 0.010 | 0.004 | 0.005 | — | 0.019 | Remainder | 3.2 | 0.74 | 0.19 |
| Example 15 | 2.50 | 0.06 | — | — | — | — | 0.010 | 0.004 | 0.005 | — | 0.019 | Remainder | 3.6 | 0.80 | 0.14 |
| Example 16 | 3.00 | 0.10 | — | — | — | — | 0.010 | 0.004 | 0.005 | — | 0.019 | Remainder | 3.7 | 0.81 | 0.10 |
| Example 17 | 0.20 | 0.10 | 0.100 | — | — | — | 0.010 | 0.005 | 0.003 | — | 0.118 | Remainder | 3.0 | 0.74 | 0.20 |
| Example 18 | 0.20 | 0.10 | 0.200 | — | 0.250 | — | 0.010 | 0.005 | 0.003 | — | 0.468 | Remainder | 3.3 | 0.75 | 0.18 |
| Example 19 | 0.20 | 0.20 | — | — | 0.300 | — | 0.010 | 0.005 | 0.003 | — | 0.318 | Remainder | 3.2 | 0.74 | 0.18 |
| Example 20 | 0.20 | 0.10 | — | 0.050 | — | 0.050 | 0.010 | 0.005 | 0.003 | — | 0.118 | Remainder | 4.5 | 0.90 | 0.10 |
| Example 21 | 0.25 | 0.10 | 0.010 | 0.010 | 0.030 | 0.020 | 0.010 | 0.010 | 0.050 | 0.010 | 0.150 | Remainder | 3.4 | 0.75 | 0.17 |
| Comparative Example 1 | 3.50 | 0.10 | — | — | — | — | 0.010 | 0.005 | 0.005 | — | 0.020 | Remainder | 3.9 | 0.84 | 0.08 |
| Comparative Example 2 | 0.20 | 0.50 | — | 0.300 | 0.200 | — | 0.010 | 0.010 | 0.010 | — | 0.530 | Remainder | 2.9 | 0.72 | 0.25 |
| Comparative Example 3 | 0.15 | 0.05 | — | — | — | — | 0.010 | 0.005 | 0.005 | — | 0.020 | Remainder | 4.9 | 0.90 | 0.20 |
| Comparative Example 4 | 0.15 | 0.06 | — | — | — | — | 0.010 | 0.004 | 0.005 | — | 0.019 | Remainder | 0.5 | 0.48 | 26.12 |
| Comparative Example 5 | 0.15 | 0.06 | — | — | — | — | 0.010 | 0.005 | 0.003 | — | 0.018 | Remainder | 0.1 | 0.11 | 118.95 |

TABLE 2

| | Wire diameter of aluminum wire (mm) | Number of aluminum wires | Stranded wire diameter of aluminum stranded wire (mm) |
|---|---|---|---|
| Example 1 | 1.6 | 19 | 8.0 |
| Example 2 | 1.4 | 37 | 9.8 |
| Example 3 | 1.8 | 61 | 16.2 |
| Example 4 | 2.3 | 61 | 20.7 |
| Example 5 | 2.9 | 61 | 24.1 |
| Example 6 | 1.4 | 37 | 9.8 |
| Example 7 | 1.4 | 37 | 9.8 |
| Example 8 | 1.4 | 37 | 9.8 |
| Example 9 | 1.4 | 37 | 9.8 |
| Example 10 | 1.4 | 37 | 9.8 |
| Example 11 | 1.4 | 37 | 9.8 |
| Example 12 | 1.4 | 37 | 9.8 |
| Example 13 | 1.4 | 37 | 9.8 |
| Example 14 | 1.4 | 37 | 9.8 |
| Example 15 | 1.4 | 37 | 9.8 |
| Example 16 | 1.4 | 37 | 9.8 |
| Example 17 | 1.4 | 37 | 9.8 |
| Example 18 | 1.4 | 37 | 9.8 |
| Example 19 | 1.4 | 37 | 9.8 |
| Example 20 | 1.4 | 37 | 9.8 |
| Example 21 | 1.4 | 37 | 9.8 |
| Comparative Example 1 | 1.4 | 37 | 9.8 |
| Comparative Example 2 | 1.4 | 37 | 9.8 |
| Comparative Example 3 | 1.4 | 37 | 9.8 |

TABLE 2-continued

| | Wire diameter of aluminum wire (mm) | Number of aluminum wires | Stranded wire diameter of aluminum stranded wire (mm) |
|---|---|---|---|
| Comparative Example 4 | 1.4 | 37 | 9.8 |
| Comparative Example 5 | 1.4 | 37 | 9.8 |

(Measurement and Evaluation)

In order to evaluate of the influence of the cross sectional area reduction at the portion crimped by the crimp-style terminals and the contact state between the tube part interior of the crimp-style terminal and the aluminum stranded wire of the coated electric wire with the crimp-style terminals obtained in the above-mentioned Examples and Comparative Examples, the below described measurements and evaluations were performed using samples containing the crimped part with the crimp-style terminals. The results are shown in Table 1 and Table 3.

(1) Within an Area of 25 μm×60 μm in a Cross Section Perpendicular to the Longitudinal Direction, the Length Adding Together all Portions Having Crystal Misorientation of More than 1 Degree and 15 Degrees or Less Between Adjacent Crystal Grains The above-mentioned length within the above-mentioned area for the coated electric wire with the crimp-style terminals was obtained from the crystal orientation analysis data calculated using analysis software (OIM Analysis produced by TSL Inc.) from crystal orientation data measured continuously using an EBSD detector (OIM 5.0 HIKARI manufactured by TSL Inc.) attached to a high resolution scanning analytical electron microscope (JSM-7001FA manufactured by JOEL Ltd.).

The measurement target was defined as the surface prepared by mirror finishing the transverse cross section of the aluminum wire by electropolishing, and the measurement area was defined as 25 μm×60 μm. The measurement was performed at the step size of 0.1 μm. By the analysis software, the length adding together all of the portions having crystal misorientation of more than 1 degree and 15 degrees or less between adjacent crystal grains was calculated based on images of Rotation Angle. This measurement was performed at n3, and the average value thereof was calculated as the above-mentioned length.

(2) Proportion of KAM Value of Crystal Misorientation of More than 1 Degree and 15 Degrees or Less, Relative to the Area of 25 μm×60 μm in the Cross Section Perpendicular to the Longitudinal Direction Proportion of KAM value of crystal misorientation of more than 1 degree and 15 degrees or less relative to the above-mentioned area for the coated electric wire with the crimp-style terminals was obtained from the crystal orientation analysis data calculated using analysis software (OIM Analysis produced by TSL Inc.) from crystal orientation data measured continuously using an EBSD detector (OIM 5.0 HIKARI manufactured by TSL Inc.) attached to a high resolution scanning analytical electron microscope (JSM-7001FA manufactured by JOEL Ltd.).

The measurement target was defined as the surface prepared by mirror finishing the transverse cross section of the aluminum wire by electropolishing, and the measurement area was defined as 25 μm×60 μm. The measurement was performed at the step size of 0.1 μm. The proportion of the KAM value having crystal misorientation of more than 1 degree and 15 degrees or less relative to the measurement area was calculated with the KAM image by the analysis software. It should be noted that the maximum value of the KAM value was set to 15 degrees. This measurement was performed at n3, and the average value thereof was calculated as the proportion of the above-mentioned KAM value.

(3) Average Crystal Grain Size

The average crystal grain size for the coated electric wire with the crimp-style terminals was obtained from the crystal orientation analysis data calculated using analysis software (OIM Analysis produced by TSL Inc.) from crystal orientation data measured continuously using an EBSD detector (OIM 5.0 HIKARI manufactured by TSL Inc.) attached to a high resolution scanning analytical electron microscope (JSM-7001FA manufactured by JOEL Ltd.).

The measurement target was defined as the surface prepared by mirror finishing the transverse cross section of the aluminum wire by electropolishing, and the measurement area was defined as 25 μm×60 μm. Measurement was performed at the step size of 0.1 μm. By the analysis software, the average crystal grain size was calculated with a Grain Size (Diameter) chart. This measurement was performed at n3, and the average value thereof was calculated as the average crystal grain size.

(4) Electrical Conductivity

Using the coated electric wire with the crimp-style terminals, the electric wire length was set as 200 mm, electrical current was applied between terminals in a constant temperature bath kept at 20° C. (±0.5° C.) to measure the resistance value by the four-terminal method, and the electrical conductivity of the aluminum wire was calculated from the cross section area of the aluminum stranded wire. It should be noted that the resistance of both terminals themselves was excluded. Such measurement of the electrical conductivity was performed on three coated electric wires with the crimp-style terminals, and the average value of the three measured values was calculated as the electrical conductivity. For the electrical conductivity, the following ranking was performed. A larger electrical conductivity is better, and C rank is poor.

A: electrical conductivity of 62% IACS or more

B: electrical conductivity of 55% IACS or more and less than 62% IACS

C: electrical conductivity of less than 55% IACS (5) Nominal Breaking Strength

The nominal breaking strength of the coated electric wire with the crimp-style terminals was measured as the crimped part strength. The electric wire length was defined as 200 mm, both terminals were fixed by chucks, and the tensile testing was conducted. The maximum force (N) required until the breakage was divided by the cross section area ($mm^2$) of the aluminum conductor to obtain the nominal breaking strength ($N/mm^2$), and the following ranking was performed. It should be noted that, in order for variation in crimping, variation in measurement, etc. to be considered, the nominal breaking strength was calculated in 5 $N/mm^2$ increments considering measurement accuracy (i.e. noted as 90 $N/mm^2$ when 90 $N/mm^2$ or more and less than 95 $N/mm^2$, for example). As the nominal breaking strength becomes larger, the decline in the crimped part strength at the crimped part can be suppressed, and the C rank is poor.

A: nominal breaking strength of 110 $N/mm^2$ or more

B: nominal breaking strength of 90 $N/mm^2$ or more and less than 110 $N/mm^2$

C: nominal breaking strength of less than 90 $N/mm^2$ (6) Shock Absorption Energy As the shock resistance, the shock absorption energy was measured using the coated electric wire with the crimp-style terminal. More specifically, first, a 1-m coated electric wire with the crimp-style terminal at one end was prepared, and the insulating coating and the sheath were peeled off to make the aluminum stranded wire with the crimp-style terminal at one end. A weight was attached to the aluminum stranded wire end to which the crimp-style terminal was not connected. Next, the crimp-style terminal was fixed by a vise so as to be perpendicular to the gravity direction, the weight was lifted to the height of the crimp-style terminal, and the aluminum stranded wire was also raised to at least the height of the crimp-style terminal, followed by releasing the weight, and free falling was performed for the 1 m corresponding to the length of the aluminum stranded wire. In order to curb the variation in load on the crimp-style terminal, the interval between the weight and the crimp-style terminal immediately before raising and releasing the weight was set to within 10 times of the diameter of the aluminum stranded wire. The above-mentioned experiment was performed by variously replacing the weight, the maximum weight of the weight at which not even one of the element wires of the aluminum stranded wide connected to the crimp-style terminal broke was recorded, the potential energy at this time was divided by the cross section area of the aluminum stranded wire to calculate the shock absorption energy of the aluminum stranded wire relative to the free falling of the weight. The testing was done by selecting the weight so that the shock absorption energy value would be in 0.05 $J/mm^2$ increments. For the shock absorption energy, the following ranking was performed. With larger shock absorption energy, the decline in the shock resistance of the crimped part can be suppressed more.

A: shock absorption energy of 0.50 J/mm$^2$ or greater

B: shock absorption energy of 0.25 J/mm$^2$ or greater and less than 0.50 J/mm$^2$ C: shock absorption energy of less than 0.25 J/mm$^2$ (7) Comprehensive Evaluation As a comprehensive evaluation, the following ranking was performed.

◎: electrical conductivity of 62% IACS or greater, nominal breaking strength of 110 N/mm$^2$ or greater, and shock absorption energy of 0.50 J/mm$^2$ or greater ○: electrical conductivity of 55% IACS or greater, nominal breaking strength of 90 N/mm$^2$ or greater, and shock absorption energy of 0.25 J/mm$^2$ or greater; electrical conductivity of 55% IACS or greater and less than 62% IACS, or nominal breaking strength of 90 N/mm$^2$ or greater and less than 110 N/mm$^2$, or shock absorption energy of 0.25 J/mm$^2$ or greater and less than 0.50 J/mm$^2$ x: electrical conductivity of less than 55% IACS, or nominal breaking strength of less than 90 N/mm$^2$, or shock absorption energy of less than 0.25 J/mm$^2$

TABLE 3

| | Wire with terminals | | | |
|---|---|---|---|---|
| | Electrical conductivity of aluminum wire (% IACS) | Nominal breaking strength (N/mm$^2$) | Shock absorption energy (J/mm$^2$) | Comprehensive evaluation |
| Example 1 | 63 | 95 | 0.25 | ○ |
| Example 2 | 62 | 110 | 0.50 | ◎ |
| Example 3 | 60 | 110 | 0.45 | ○ |
| Example 4 | 61 | 100 | 0.35 | ○ |
| Example 5 | 61 | 105 | 0.40 | ○ |
| Example 6 | 62 | 150 | 0.45 | ○ |
| Example 7 | 61 | 130 | 0.45 | ○ |
| Example 8 | 62 | 100 | 0.55 | ○ |
| Example 9 | 62 | 95 | 0.60 | ○ |
| Example 10 | 61 | 95 | 0.65 | ○ |
| Example 11 | 62 | 90 | 0.70 | ○ |
| Example 12 | 62 | 90 | 0.75 | ○ |
| Example 13 | 60 | 115 | 0.45 | ○ |
| Example 14 | 58 | 120 | 0.40 | ○ |
| Example 15 | 56 | 130 | 0.30 | ○ |
| Example 16 | 55 | 130 | 0.25 | ○ |
| Example 17 | 59 | 125 | 0.40 | ○ |
| Example 18 | 55 | 135 | 0.35 | ○ |
| Example 19 | 57 | 130 | 0.35 | ○ |
| Example 20 | 56 | 125 | 0.40 | ○ |
| Example 21 | 55 | 125 | 0.40 | ○ |
| Comparative Example 1 | 53 | 130 | 0.20 | X |
| Comparative Example 2 | 35 | 140 | 0.15 | X |
| Comparative Example 3 | 61 | 150 | 0.05 | X |
| Comparative Example 4 | 62 | 80 | 0.20 | X |
| Comparative Example 5 | 64 | 40 | 0.05 | X |

As shown in Tables 1 to 3, Examples 1 to 21 have predetermined compositions, the length adding together all portions having crystal misorientation of more than 1 degree and 15 degrees or less between adjacent crystal grains was 0.6 mm or more and 4.8 mm or less, and the electrical conductivity was 55% IACS or more. For this reason, the decline in the electrical conductivity, the decline in the crimped part strength and the decline in the shock resistance could be suppressed. In particular, with Example 2, the length adding together all portions having crystal misorientation of more than 1 degree and 15 degrees or less between adjacent crystal grains, the proportion of the KAM value of the crystal misorientation of more than 1 degree and 15 degrees or less, and the average crystal grain size were all within favorable ranges; therefore, the decline in the electrical conductivity, the decline in the crimped part strength and the decline in the shock resistance could be further suppressed.

On the other hand, with Comparative Example 1 and Comparative Example 2, the component compositions were outside the ranges of the present invention, and the electrical conductivity declined. Furthermore, the shock resistance was inferior. With Comparative Example 3, since the contact-type annealing was not performed, it embrittled, the length adding together all portions having crystal misorientation of more than 1 degree and 15 degrees or less exceeded 4.8 mm, and the shock resistance declined extremely. With Comparative Example 4, since the processing rate of the cold wire drawing was set to less than 50%, the length adding together all portions having crystal misorientation of more than 1 degree and 15 degrees or less was less than 0.6 mm, and the crimped part strength and the shock resistance declined. With Comparative Example 5, since the heating temperature of the contact-type annealing was set to exceed 400° C., the length adding together all portions having crystal misorientation of more than 1 degree and 15 degrees or less was less than 0.6 mm due to grain coarsening and distortion elimination, and thus the crimped part strength and the shock resistance declined.

EXPLANATION OF REFERENCE NUMERALS

1 aluminum wire
2 aluminum stranded wire
3 insulator
4 sheath
5 crimp-style terminal
6 coated electric wire
10 coated electric wire with crimp-style terminal

The invention claimed is:

1. An aluminum wire comprising a composition containing 3.00% by mass or less of Fe and 0.20% by mass or less of Si, and further containing 0.010% by mass or more and 0.500% by mass or less in total of at least one element selected from the group consisting of Cu, Mn, Mg, Zn, Ti, B, V and Ni, wherein a remainder consists of Al and inevitable impurities, wherein, within an area of 25 μm×60 μm in a cross section perpendicular to a longitudinal direction of the aluminum wire, a length adding together all portions having crystal misorientation of more than 1 degree and 15 degrees or less between adjacent crystal grains is 0.6 mm or more and 4.8 mm or less, and wherein electrical conductivity of the aluminum wire is 55% IACS or more.

2. The aluminum wire according to claim 1, wherein the composition contains 0.25% by mass or less of Fe.

3. The aluminum wire according to claim 1, wherein a proportion of KAM value of crystal misorientation of more than 1 degree and 15 degrees or less relative to the area is 0.50 or more and 0.90 or less.

4. The aluminum wire according to claim 1, wherein an average crystal grain size in the cross section is 0.10 μm or more and 10.00 μm or less.

5. An aluminum stranded wire comprising 19 or more and 61 or less of the aluminum wires according to claim 1 intertwined, wherein wire diameters of the aluminum wires are 1.4 mm or more and 2.9 mm or less.

6. A coated electric wire comprising the aluminum stranded wire according to claim 5, a cylindrical insulator which covers an outer circumference of the aluminum stranded wire, and a sheath which covers an outer circumference of the insulator.

7. A coated electric wire with a crimp-style terminal, comprising a crimp-style terminal which is crimped to the coated electric wire according to claim 6.

8. A CVT cable or a CVT cable with a crimp-style terminal, comprising three of the coated electric wires according to claim 6 intertwined therein.

9. The aluminum wire according to claim 2, wherein a proportion of KAM value of crystal misorientation of more than 1 degree and 15 degrees or less relative to the area is 0.50 or more and 0.90 or less.

10. The aluminum wire according to claim 2, wherein an average crystal grain size in the cross section is 0.10 μm or more and 10.00 μm or less.

11. An aluminum stranded wire comprising 19 or more and 61 or less of the aluminum wires according to claim 2 intertwined, wherein wire diameters of the aluminum wires are 1.4 mm or more and 2.9 mm or less.

12. The aluminum wire according to claim 3, wherein an average crystal grain size in the cross section is 0.10 μm or more and 10.00 μm or less.

13. An aluminum stranded wire comprising 19 or more and 61 or less of the aluminum wires according to claim 3 intertwined, wherein wire diameters of the aluminum wires are 1.4 mm or more and 2.9 mm or less.

14. An aluminum stranded wire comprising 19 or more and 61 or less of the aluminum wires according to claim 5 intertwined, wherein wire diameters of the aluminum wires are 1.4 mm or more and 2.9 mm or less.

15. A CVT cable or a CVT cable with a crimp-style terminal, comprising the coated electric wires with the crimp-style terminal according to claim 7 intertwined therein.

* * * * *